US008142228B1

(12) United States Patent
Wu

(10) Patent No.: US 8,142,228 B1
(45) Date of Patent: Mar. 27, 2012

(54) CHARGER AND ADAPTER PLUG ASSEMBLY

(75) Inventor: Jui-Hsiung Wu, Taipei (TW)

(73) Assignees: Well Shin Technology Co., Ltd., Taipei (TW); Dongguan Well Shin Electronic Products Co., Ltd., Guangdong (CN)

( * ) Notice: Subject to any disclaimer, the term of this patent is extended or adjusted under 35 U.S.C. 154(b) by 0 days.

(21) Appl. No.: 13/090,248

(22) Filed: Apr. 19, 2011

(51) Int. Cl.
*H01R 31/06* (2006.01)

(52) U.S. Cl. ........................................ 439/628

(58) Field of Classification Search .................. 439/628, 439/848, 131, 651–654

See application file for complete search history.

(56) References Cited

U.S. PATENT DOCUMENTS

| | | | | |
|---|---|---|---|---|
| 5,906,509 | A * | 5/1999 | Wu | 439/518 |
| 6,790,062 | B1 * | 9/2004 | Liao | 439/171 |
| 7,052,298 | B1 * | 5/2006 | Cheng | 439/171 |
| 8,033,867 | B1 * | 10/2011 | Kessler et al. | 439/652 |
| 2003/0203682 | A1 * | 10/2003 | Chen | 439/848 |
| 2007/0182368 | A1 * | 8/2007 | Yang | 320/110 |

* cited by examiner

*Primary Examiner* — Jean F Duverne

(74) *Attorney, Agent, or Firm* — Lin & Associates IP, Inc.

(57) ABSTRACT

The invention provides a charger and adapter plug assembly including a first adapter plug, a second adapter plug, a third adapter plug and a charger. The first adapter plug has a set of AU standard pins and a first storage cavity with a first socket therein. The charger has two flat straight pins on one end and a USB port on the other end. The charger is detachably stored into the first storage cavity, so as to make the two flat straight pins electrically plugged into the first socket. The second adapter plug has a set of UK standard pins, a second storage cavity with an EU socket therein and an AU socket. The first adapter plug is detachably assembled to the second adapter plug, so as to make the AU standard pins electrically plugged into the AU socket. The third adapter plug has a set of EU pins and a second socket. The third adapter plug is detachably stored into the second storage cavity, so as to make the EU standard pins electrically plugged into the EU socket.

9 Claims, 7 Drawing Sheets

CHARGER AND ADAPTER PLUG ASSEMBLY

BACKGROUND OF THE INVENTION

1. Field of the Invention

The invention relates to a charger and adapter plug assembly, and more particularly, to a charger and adapter plug assembly providing multiple ways for adapting and electricity-charging.

2. The Related Art

Traditionally, a power plug is often of a single specification and varies with different countries. A power plug of a single specification for an electric appliance is only adapted to a receptacle of the single specification. It is inconvenient in use if a receptacle of only another specification is available. If a user wants to use the electric appliance specified for his country in a foreign country, he may need to purchase a transformer and power adapter assembly containing plural adapter plugs of different specifications. However, it is usually inconvenient for a user to carry the assembly containing plural individual adapter plugs which are lost easily.

SUMMARY OF THE INVENTION

The main object of the invention is to provide a charger and adapter plug assembly including a first adapter plug, a charger, a second adapter plug and a third adapter plug.

The first adapter plug has a set of AU standard terminals and a first storage cavity with a first socket therein. The charger is of a cylindrical shape and has two flat straight terminals on one end and a USB port on the other end. The charger is detachably stored into the first storage cavity, so as to make the two flat straight terminals electrically plugged into the first socket.

The second adapter plug has a set of UK standard terminals, a second storage cavity with an EU standard socket therein and an AU standard socket adapted to the AU standard terminals of the first adapter plug. The first adapter plug is detachably assembled onto the second adapter plug, so as to make the AU standard terminals electrically plugged into the AU standard socket.

The third adapter plug has a set of EU standard terminals adapted to the EU standard socket of the second adapter plug and a second socket adapted to the flat straight terminals of the charger. The third adapter plug is detachably stored into the second storage cavity, so as to make the EU standard terminals electrically plugged into the EU standard socket.

The advantage and spirit of the invention may be understood by the following recitations together with the appended drawings.

DETAILED DESCRIPTION OF THE PREFERRED EMBODIMENT

Figure 1:
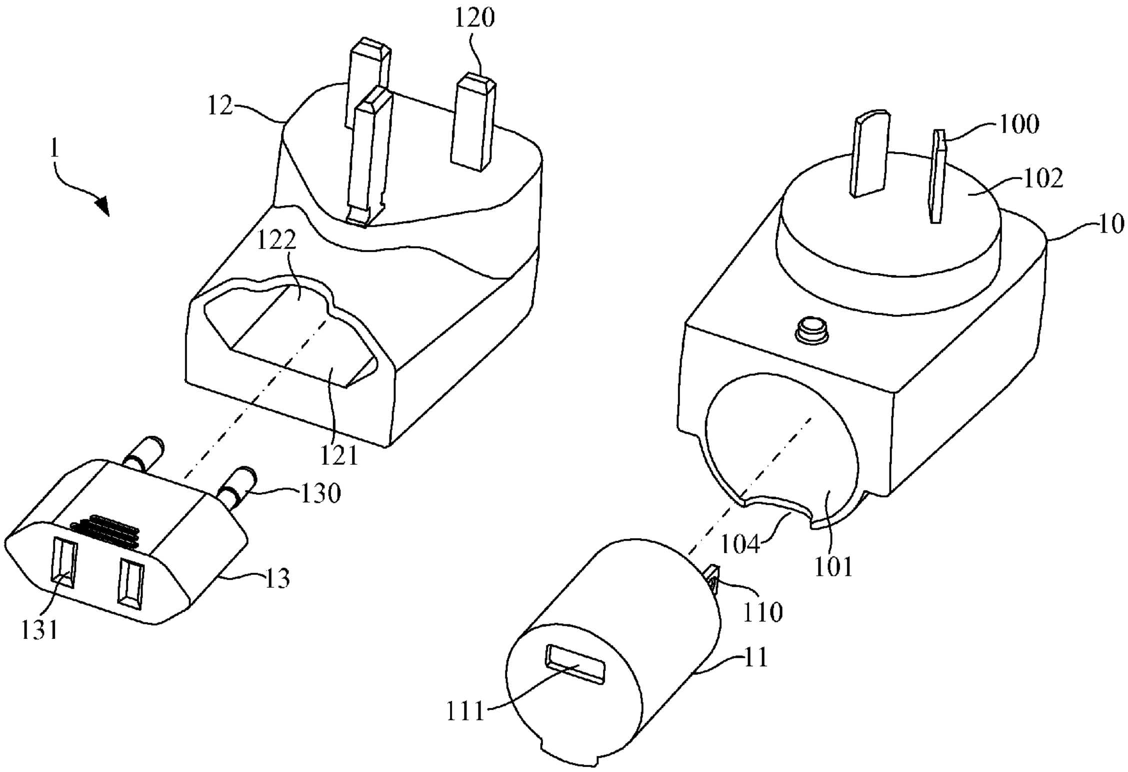
FIG. 1 is an explosive view of the charger and adapter plug assembly according to one embodiment of the present invention.

Please refer to FIG. 1. The charger and adapter plug assembly 1 of the invention includes a first adapter plug 10, a charger 11, a second adapter plug 12 and a third adapter plug 13.

Figure 4A:
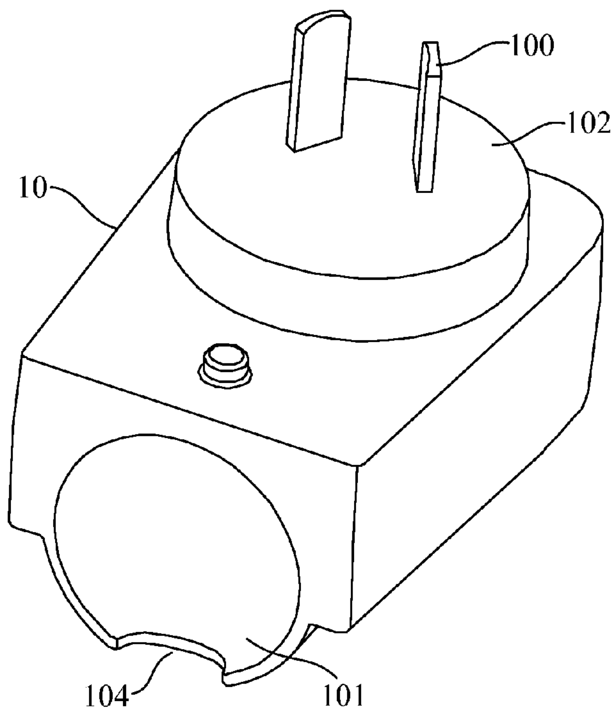
FIG. 4A is an exterior view of the first adapter plug.
Figure 4B:
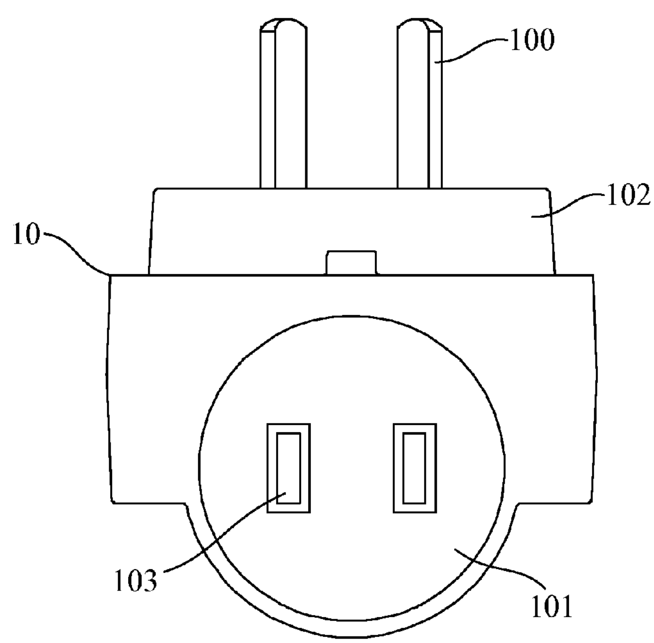
FIG. 4B is a rear view of the first adapter plug.

Please refer to FIGS. 4A and 4B. The first adapter plug 10 has a set of AU (Australian) standard terminals 100 and a storage cavity 101 with a socket 103 therein. In this embodiment, the socket 103 has two parallel elongated insertion holes. The AU standard terminals may be disposed at the bottom of the first adapter plug 10, and the inlet of the storage cavity 101 may be at the rear end of the first adapter plug 10. The bottom of the first adapter plug 10 has a protrusion portion 102, and the AU standard terminals 100 may be disposed at the top of the protrusion portion 102.

Figure 7A:
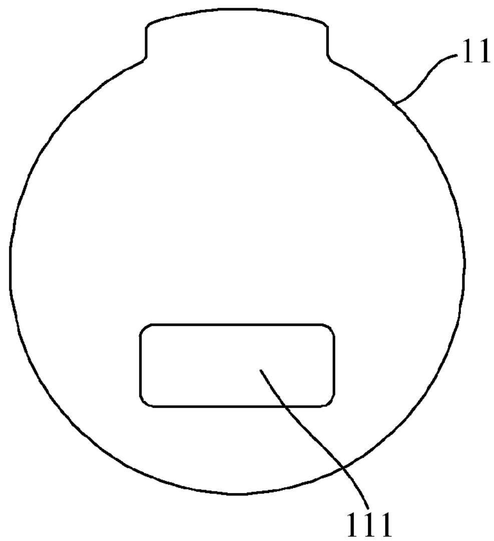
FIG. 7A is a rear view of the charger.
Figure 7B:
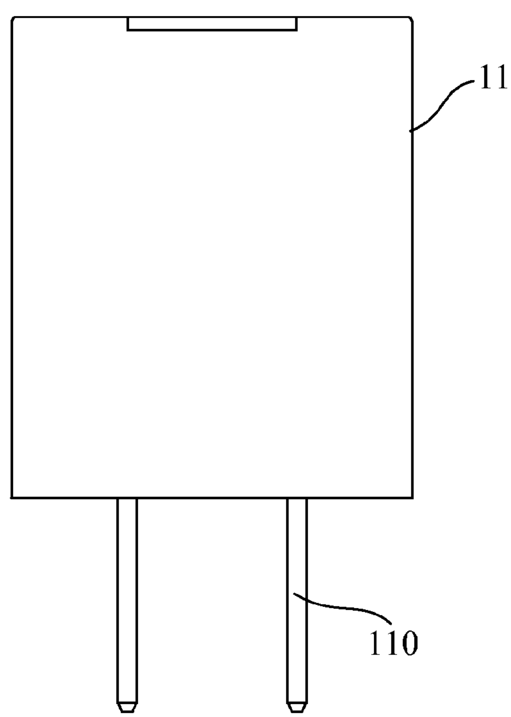
FIG. 7B is a top view of the charger.

Please refer to FIGS. 7A and 7B. The charger 11 is of a cylindrical shape and has two flat straight terminals 110 adapted to the socket 103 on one end and a USB port 111 on the other end. In practical applications, the flat straight terminals 110 are of US (United States), JP (Japan), CN (China), or TW (Taiwan) electric standard; that is to say, the socket 103 is of US, JP, CN, or TW electric standard correspondingly.

It should be noted that the charger 11 is detachably stored into the storage cavity 101, so as to make the two flat straight terminals 110 electrically plugged into the socket 103. After the charger 11 is stored into the storage cavity 101, only the end surface in which the USB port 111 is formed is exposed and aligned with the edge of the inlet of the storage cavity 101. In this embodiment, the edge of the inlet of the storage cavity 101 partially shifts inwardly in a long axis of the first adapter plug 10 to form an indentation 104 by which a user can put his finger on a bigger area of the charger 11 which is then pulled out easily.

Figure 2:
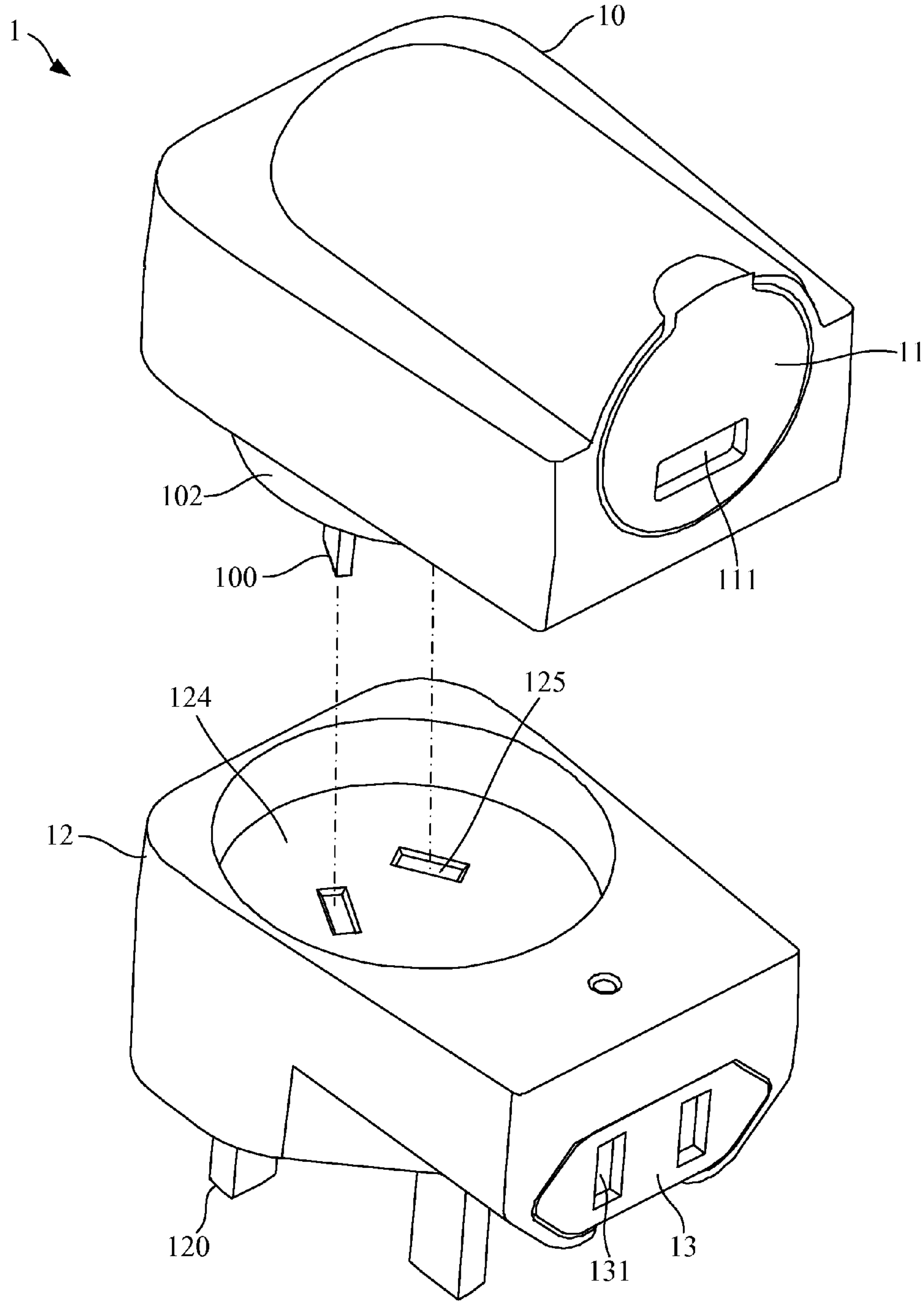
FIG. 2 is a combination view of the first adapter plug and the second adapter plug.
Figure 3:
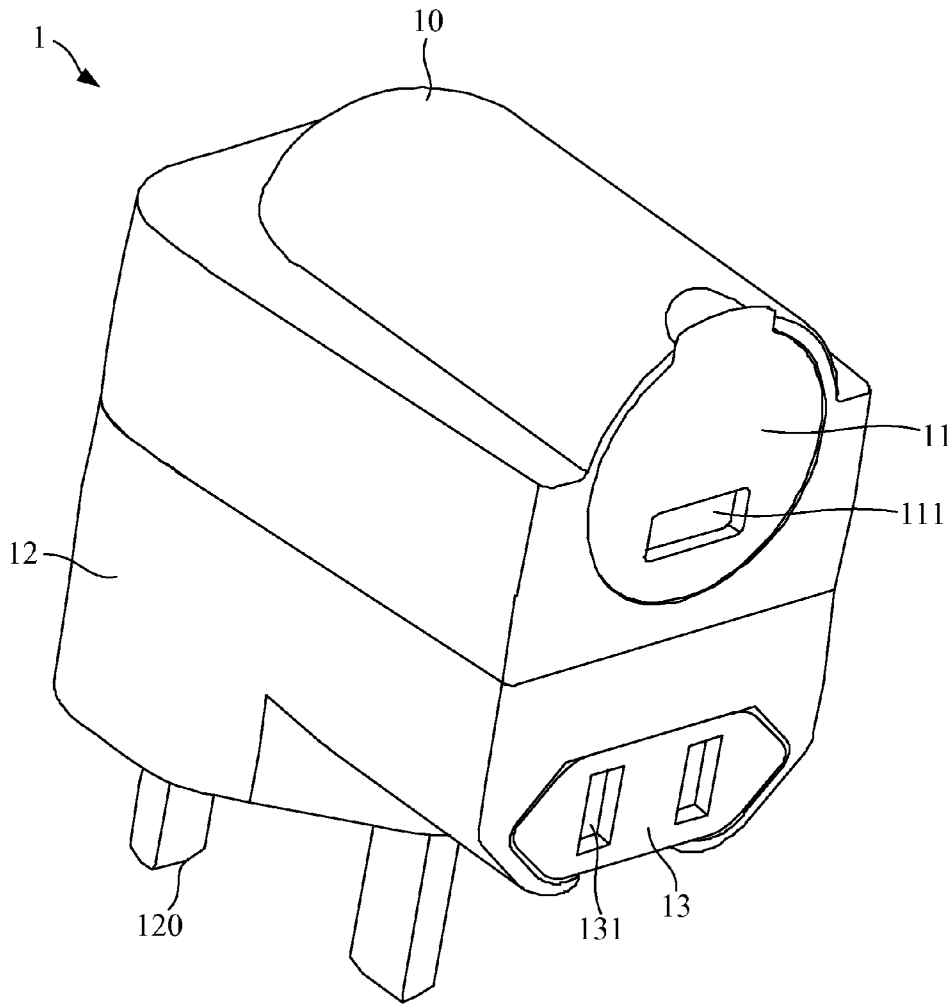
FIG. 3 is an exterior view of the charger and adapter plug assembly according to one embodiment of the present invention.
Figure 5A:
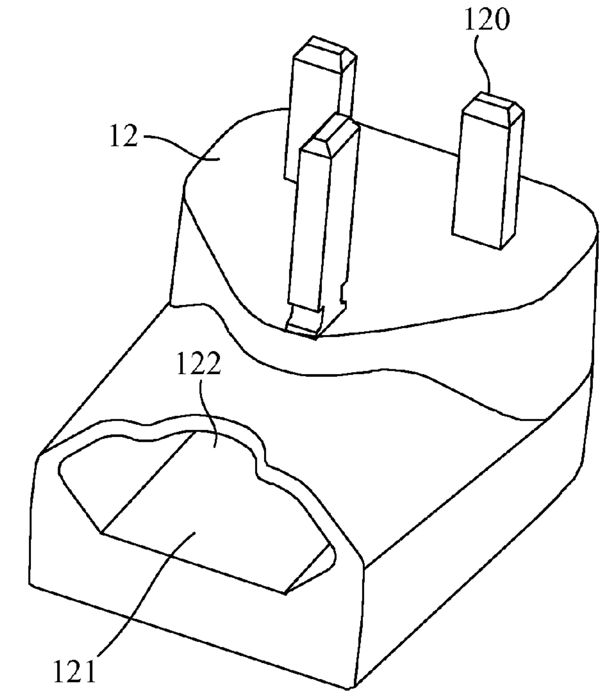
FIG. 5A is an exterior view of the second adapter plug.
Figure 5B:
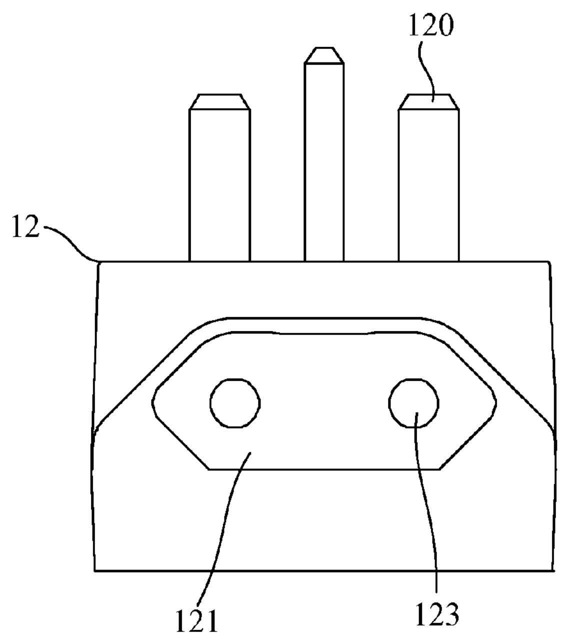
FIG. 5B is a rear view of the second adapter plug.

Please refer to FIGS. 5A and 5B. The second adapter plug 12 has a set of UK (United Kingdom) standard terminals 120 and a storage cavity 121 with an EU (Europe) standard socket 123 therein. The UK standard terminals 120 are disposed at the bottom of the second adapter plug 12, and the inlet of the storage cavity 121 is at the rear end of the second adapter plug 12. As shown in FIG. 2, the second adapter plug 12 has a recess 124 on the top thereof, and an AU standard socket 125 is at the bottom of the recess 124. The foregoing protrusion portion 102 of the first adapter plug 10 is adapted to be placed into the recess 124, such that the AU standard terminals 100 can be electrically plugged into the AU standard socket 125. As shown in FIG. 2, it should be noted that the first adapter plug 10 is detachably assembled onto the second adapter plug 12 in a stack manner.

Figure 6A:
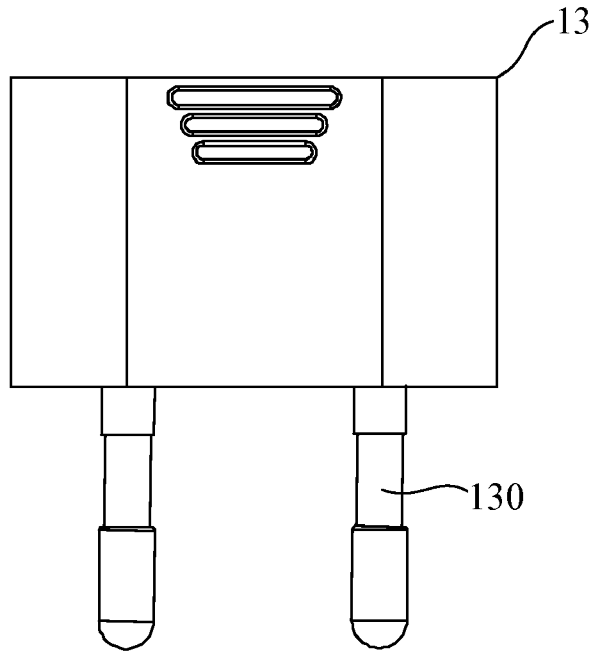
FIG. 6A is an exterior view of the third adapter plug.
Figure 6B:
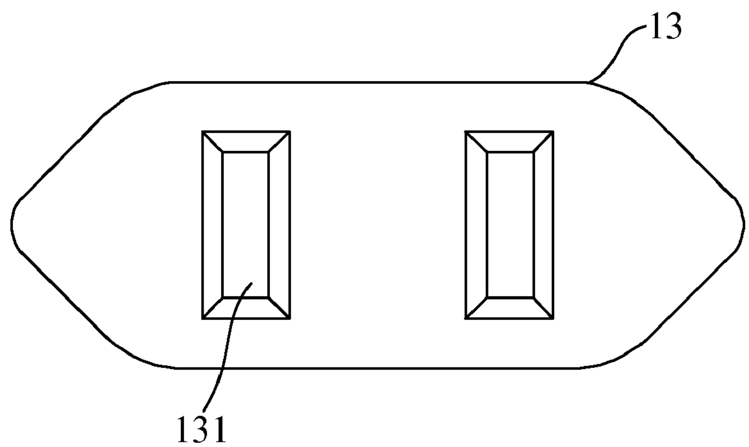
FIG. 6B is a rear view of the third adapter plug.

Please refer to FIGS. 6A and 6B. The third adapter plug 13 has a set of EU standard terminals 130 adapted to the EU standard socket 123 of the second adapter plug 12 and a socket 131 adapted to the flat straight terminals 110 of the charger 11. Similarly, the socket 131 may be of US, JP, CN, or TW electric standard. It should be noted that the third adapter plug 13 is detachably stored into the storage cavity 121, so as to make the EU standard terminals 130 electrically plugged into the EU standard socket 123. After the third adapter plug 13 is stored into the storage cavity 121, only the end surface in which the socket 131 is formed is exposed and aligned with the edge of the inlet of the storage cavity 121. In this embodiment, the edge of the inlet of the storage cavity 121 partially shifts inwardly in a long axis of the second adapter plug 12 to form an indentation 122 by which a user can put his finger on a bigger area of the third adapter plug 13 which is then pulled out easily.

In regards to function, the first adapter plug 10, the charger 11, the second adapter plug 12 and the third adapter plug 13 can be used individually or by combination. Referring to the adapting function, the first adapter plug 10 provides the adaption from US, JP, CN, or TW electric standard into AU electric standard. The second adapter plug 12 provides the adaption from EU electric standard into UK electric standard, or the adaption from AU electric standard into UK electric standard. The third adapter plug 13 provides the adaption from US, JP, CN, or TW electric standard into EU electric standard.

Referring to the electricity-charging function, the charger 11 can activate the electricity-charging via the flat straight terminals 110 plugged into a socket of US, JP, CN, or TW electric standard. If the charger 11 is stored into the first adapter plug 10 with the flat straight terminals 110 plugged into the socket 103, the electricity-charging is activated via the AU standard terminals 100 plugged into a socket of AU electric standard. If the flat straight terminals 110 of the charger 11 are plugged into the socket 131 of the third adapter plug 13, the electricity-charging is activated via the EU standard terminals 130 plugged into a socket of EU electric standard. If the charger 11 is stored into the first adapter plug 10 with the flat straight terminals 110 plugged into the socket 103, followed by the first adapter plug 10 assembled onto the second adapter plug 12 with the AU standard terminals 100 plugged into the AU standard socket 125, the electricity-charging is activated via the UK standard terminals 120 plugged into a socket of UK electric standard.

Based on the above disclosures, the charger and adapter plug assembly of the invention has the advantageous of providing multiple ways for adapting and enabling electricity-charging in the environments of different electric standards; providing the storages of the adapter plugs and the charger to avoid loss; and providing a single integrated body made by storing and assembling all elements for easy carriage.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A charger and adapter plug assembly, comprising:

a first adapter plug having a set of AU standard terminals and a first storage cavity with a first socket therein;

a charger of a cylindrical shape having two flat straight terminals on one end and a USB port on the other end, the charger being detachably stored into the first storage cavity, so as to make the two flat straight terminals electrically plugged into the first socket;

a second adapter plug having a set of UK standard terminals, a second storage cavity with an EU standard socket therein and an AU standard socket adapted to the AU standard terminals, wherein the first adapter plug is detachably assembled onto the second adapter plug, so as to make the AU standard terminals electrically plugged into the AU standard socket; and a third adapter plug having a set of EU standard terminals adapted to the EU standard socket and a second socket adapted to the flat straight terminals, wherein the third adapter plug is detachably stored into the second storage cavity, so as to make the EU standard terminals electrically plugged into the EU standard socket.

2. The assembly of claim 1, wherein the flat straight terminals are of US, JP, CN, or TW electric standard.

3. The assembly of claim 1, wherein the AU standard terminals are disposed at the bottom of the first adapter plug, the inlet of the first storage cavity is at the rear end of the first adapter plug.

4. The assembly of claim 3, wherein after the charger is stored into the first storage cavity, only the end surface in which the USB port is formed is exposed and aligned with the edge of the inlet of the first storage cavity.

5. The assembly of claim 1, wherein the UK standard terminals are disposed at the bottom of the second adapter plug, the inlet of the second storage cavity is at the rear end of the second adapter plug.

6. The assembly of claim 5, wherein after the third adapter plug is stored into the second storage cavity, only the end surface in which the second socket is formed is exposed and aligned with the edge of the inlet of the second storage cavity.

7. The assembly of claim 1, wherein the second adapter plug has a recess on the top thereof, the AU standard socket is at the bottom of the recess, the bottom of the first adapter plug has a protrusion portion adapted to the recess, the AU standard terminals are disposed at the top of the protrusion portion.

8. The assembly of claim 1, wherein the edge of the inlet of the first storage cavity partially shifts inwardly in a long axis of the first adapter plug to form an indentation.

9. The assembly of claim 1, wherein the edge of the inlet of the second storage cavity partially shifts inwardly in a long axis of the second adapter plug to form an indentation.

* * * * *